United States Patent
Tang et al.

(10) Patent No.: US 6,228,488 B1
(45) Date of Patent: *May 8, 2001

(54) PROCESS FOR MAKING LOAD LIMITING YARN

(75) Inventors: Weiming Tang, New York, NY (US); Frank Mares, Whippany; Robert Clark Morgan, Summit, both of NJ (US)

(73) Assignee: AlliedSignal Inc., Morristown, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/083,493

(22) Filed: May 22, 1998

(51) Int. Cl.[7] .................................. D01F 6/00; D01F 6/62
(52) U.S. Cl. ............................................. 428/364; 428/395
(58) Field of Search ...................................... 428/364, 395

(56) References Cited

U.S. PATENT DOCUMENTS

| 2,934,397 | 4/1960 | Landerl ....................................... 8/55 |
| 3,097,991 | 7/1963 | Miller et al. .......................... 162/157 |

(List continued on next page.)

FOREIGN PATENT DOCUMENTS

| 208131 | 6/1986 | (EP) . |
| 425 708 | 5/1991 | (EP) . |

(List continued on next page.)

OTHER PUBLICATIONS

Journal of Polymer Science 12, (1974) "Viscosity–Molecular Weight Relationship for Fractional Poly(ethylene Terephthalate", by William L. Hergenrother & Charles J. Nelson, pp. 2905–2915.

(List continued on next page.)

Primary Examiner—N. Edwards
(74) Attorney, Agent, or Firm—Melanie L. Brown; Virginia S. Andrews; Roger H. Criss (57) ABSTRACT

The present invention provides a yarn having a force-displacement profile such that:

(a) when the yarn is subjected to an initial stress barrier of from about 0.8 gram/denier to less than or equal to about 1.2 grams/denier, the yarn elongates to less than 5 percent and has an initial modulus in the range from about 30 grams/denier to about 80 grams/denier;

(b) upon subjecting the yarn to greater than the initial stress barrier and to less than or equal to about 1.5 grams/denier, the yarn elongates further to at least about 8 percent; and (c) upon subjecting the yarn to greater than 1.5 grams/denier, the modulus increases sharply and the yarn elongates further until the yarn breaks at a tensile strength of at least about 6 grams/denier, wherein the yarn comprises a multiplicity of fibers, all of the fibers have substantially the same force-displacement profile, and are made from polymers having a glass transition temperature in the range from about −40° C. to about +70° C.

The present invention also provides a process for making block copolymer and a process for making load limiting yarn from the block copolymer.

Webbing from the present yarn is useful for seat belts, parachute harnesses and lines, shoulder harnesses, cargo handling, safety nets, trampolines, safety belts or harnesses for workers at high attitudes, military arrestor tapes for slowing aircraft, ski tow lines, and in cordage applications such as for yacht mooring or oil derrick mooring.

9 Claims, 5 Drawing Sheets

U.S. PATENT DOCUMENTS

| | | | |
|---|---|---|---|
| 3,098,691 | 7/1963 | Pascal | 8/55 |
| 3,099,067 | 7/1963 | Merriam et al. | 28/82 |
| 3,154,374 | 10/1964 | Gruschke et al. | 8/130.1 |
| 3,296,062 | 1/1967 | Truslow | 161/91 |
| 3,322,163 | 5/1967 | Hughes | 139/383 |
| 3,382,305 | 5/1968 | Breen | 264/171 |
| 3,408,433 | 10/1968 | Brayford . | |
| 3,418,065 | 12/1968 | Bount et al. | 8/55 |
| 3,464,459 | 9/1969 | Ballard | 139/383 |
| 3,486,791 | 12/1969 | Stoffel et al. | 297/386 |
| 3,530,904 | 9/1970 | Ballard | 139/383 |
| 3,550,957 | 12/1970 | Radke et al. | 297/386 |
| 3,614,798 | 10/1971 | Serbin | 8/166 |
| 3,671,620 | 6/1972 | Inoue . | |
| 3,756,288 | 9/1973 | Seo et al. | 139/383 |
| 3,823,748 | 7/1974 | Allman et al. | 139/383 |
| 3,841,831 | 10/1974 | Miller | 8/21 |
| 3,872,895 | 3/1975 | Takada | 139/383 |
| 3,895,909 | 7/1975 | Greer | 8/176 |
| 3,914,502 | 10/1975 | Hayashi et al. . | |
| 3,926,227 | 12/1975 | Takada et al. | 139/383 |
| 3,927,167 | 12/1975 | Reese . | |
| 3,957,905 | 5/1976 | Sumoto et al. | 260/860 |
| 4,031,165 | 6/1977 | Saiki et al. | 260/860 |
| 4,045,401 | 8/1977 | Steumark et al. | 260/42.18 |
| 4,053,270 | 10/1977 | Collier et al. | 425/144 |
| 4,110,411 | 8/1978 | Imanaka et al. . | |
| 4,138,157 | 2/1979 | Pickett et al. | 297/386 |
| 4,228,829 | 10/1980 | Kikuchi | 139/408 |
| 4,350,006 | 9/1982 | Okamoto et al. | 57/250 |
| 4,500,686 | 2/1985 | Kobayashi et al. | 525/408 |
| 4,584,353 | 4/1986 | Kobayashi et al. | 525/438 |
| 4,670,498 | 6/1987 | Furusawa et al. | 524/381 |
| 4,670,510 | 6/1987 | Kobayashi et al. | 525/89 |
| 4,680,156 | 7/1987 | Collier | 264/171 |
| 4,680,345 | 7/1987 | Kobayashi et al. . | |
| 4,694,049 | 9/1987 | Morita et al. . | |
| 4,710,423 | 12/1987 | Imamura | 428/272 |
| 4,784,474 | 11/1988 | Yamamoto et al. | 350/354 |
| 4,902,299 | 2/1990 | Anton | 8/442 |
| 4,942,219 | 7/1990 | Yatsuka et al. . | |
| 4,945,191 | 7/1990 | Satsuka et al. . | |
| 5,225,497 | 7/1993 | Ishii . | |
| 5,357,784 | 10/1994 | Collier | 73/54.14 |
| 5,376,440 | 12/1994 | Koseki | 428/229 |
| 5,547,143 | 8/1996 | Miller, III et al. | 242/379 |
| 5,646,077 | 7/1997 | Matsunega et al. | 442/415 |
| 5,656,700 | 8/1997 | Kagi et al. | 525/437 |
| 5,716,568 | 2/1998 | Kaegi et al. | 264/103 |
| 5,830,811 | * 11/1998 | Tang et al. | 442/216 |

FOREIGN PATENT DOCUMENTS

| | | |
|---|---|---|
| 697428 | 8/1995 | (EP) . |
| 4115 | 2/1973 | (JP) . |
| 4116 | 2/1973 | (JP) . |
| 49037 | 12/1977 | (JP) . |
| 157117 | 9/1984 | (JP) . |
| 253764 | 9/1984 | (JP) . |
| 60-031525 | 2/1985 | (JP) . |
| 298209 | 12/1989 | (JP) . |
| 2097519 | 4/1990 | (JP) . |
| 2097520 | 4/1990 | (JP) . |
| 2099554 | 4/1990 | (JP) . |
| 2099555 | 4/1990 | (JP) . |
| 252729 | 10/1990 | (JP) . |
| 259918 | 11/1991 | (JP) . |
| 72325 | 3/1992 | (JP) . |
| 27268 | 5/1992 | (JP) . |
| 264156 | 9/1992 | (JP) . |
| 5059192 | 3/1993 | (JP) . |
| 57302 | 8/1993 | (JP) . |
| 6172507 | 6/1994 | (JP) . |
| 90717 | 4/1995 | (JP) . |
| 9-143816 | 10/1997 | (JP) . |

OTHER PUBLICATIONS

Textile Research Journal 66(11), (1996) "Effects of Molecular Weight on Melt Spinning and Mechanical Properties of High Performance Poly(ethylene Terephthalate) Fibers", by Andrzej Ziabicki, pp. 705–712.

Journal of Applied Polymer Science 22 (1978) "Molecular Weight–Viscosity Relationships for Poly (1 4–butylene Terephthalate)", by W.F.H. Borman, pp. 2119–2126.

Principles of Polymer Chemistry by Paul J. Flory (1953) pp. 308–310.

Textile Research Institute, "Identifying Critical Process Variables in Poly(ethylene Terephthalate Melt Spinning", by A. Dutta & V. Nadkarni, (Jan. 1984) pp. 35–42.

U.S. application No. 08/788,895, Tang et al.

U.S. application No. 08/819,066, Tang et al.

U.S. application No. 08/819,931, Tang et al.

U.S. application No. 09/042,158, Tang et al.

Cogswell, F., "Measuring the extensional rheology of polymer melts," *Trans. Soc. Rheol.*, vol. 16, pp. 383–403 (1972).

Dufresne, A. et al., "Mechanical Behavior of Sheets Prepared from Sugar Beet Cellulose Microfibrils," *J. Appl. Polm. Sci.*, vol. 61, pp. 1185–1193 (1997).

Hongu, T. et al., *New Fibers*, pp. 30–34, Ellis Horwood Series in Polymer Science and Technology (1990).

Hongu, T. et al., *New Fibers*, pp. 55–66, Ellis Horwood Series in Polymer Science and Technology (1990).

Kerr, P., "Lyocell fibre: Reversing the Decline of Cellulosics," *Technical Textiles*, vol. 3, pp. 18–23 (1994).

Mortimer, S. et al., "Methods for Reducing the Tendency of Lyocell Fibers to Fibrillate," *J. Appl. Polym. Sci.*, vol. 60, pp. 305–316 (1996).

"Murata: Spinning Microfiber Yarns on the MJS System," *Textile World*, vol. 144, pp. 42–48 (Jan.–Jun. 1996).

Nicolai, M. et al., "Textile Crosslinking Reactions to Reduce the Fibrillation Tendency of Lyocell Fibers," *Textile Res. J.*, vol. 66, pp. 575–580 (1996).

Robeson, L. et al., "Microfiber Formation: Immiscible Polymer Blends Involving Thermoplastic Poly(vinyl alcohol) as an Extractable Matrix, " *J. Appl. Polymer Sci.*, vol. 52, pp. 1837–1846 (1994).

Simionescu, C. et al., "Romanian Wood Chemistry," RSR Academy Publishing House, Bucharest (1973) [Single–page excerpt, Eng. translation].

Tsebrenko, M. et al., "Mechanism of Fibrillation in the Flow of Molten Polymer Mixtures," *Polymer*, vol. 17, pp. 831–834 (1976).

Warner, S., "Fiber Cross–Section and Linear Density," Chapter 5 (pp. 80–98) *Fiber Science* (1995).

T. Murphy, "Buckling Up for the Future", Ward's Auto-World, 95 (1997).

* cited by examiner

PROCESS FOR MAKING LOAD LIMITING YARN

BACKGROUND OF THE INVENTION

A typical vehicle safety seat belt system is designed to restrict the displacement of an occupant with respect to the occupant's seated position within the vehicle when the vehicle experiences a sudden, sharp deceleration. (See U.S. Pat. No. 3,322,163). A typical seat belt has three main portions: the retractor belt, the torso belt, and the lap belt and the performance of each belt may be characterized by its force-displacement curve. The area under the force-displacement curve is referred to as the energy absorbed by the safety restraint.

Figure 1:
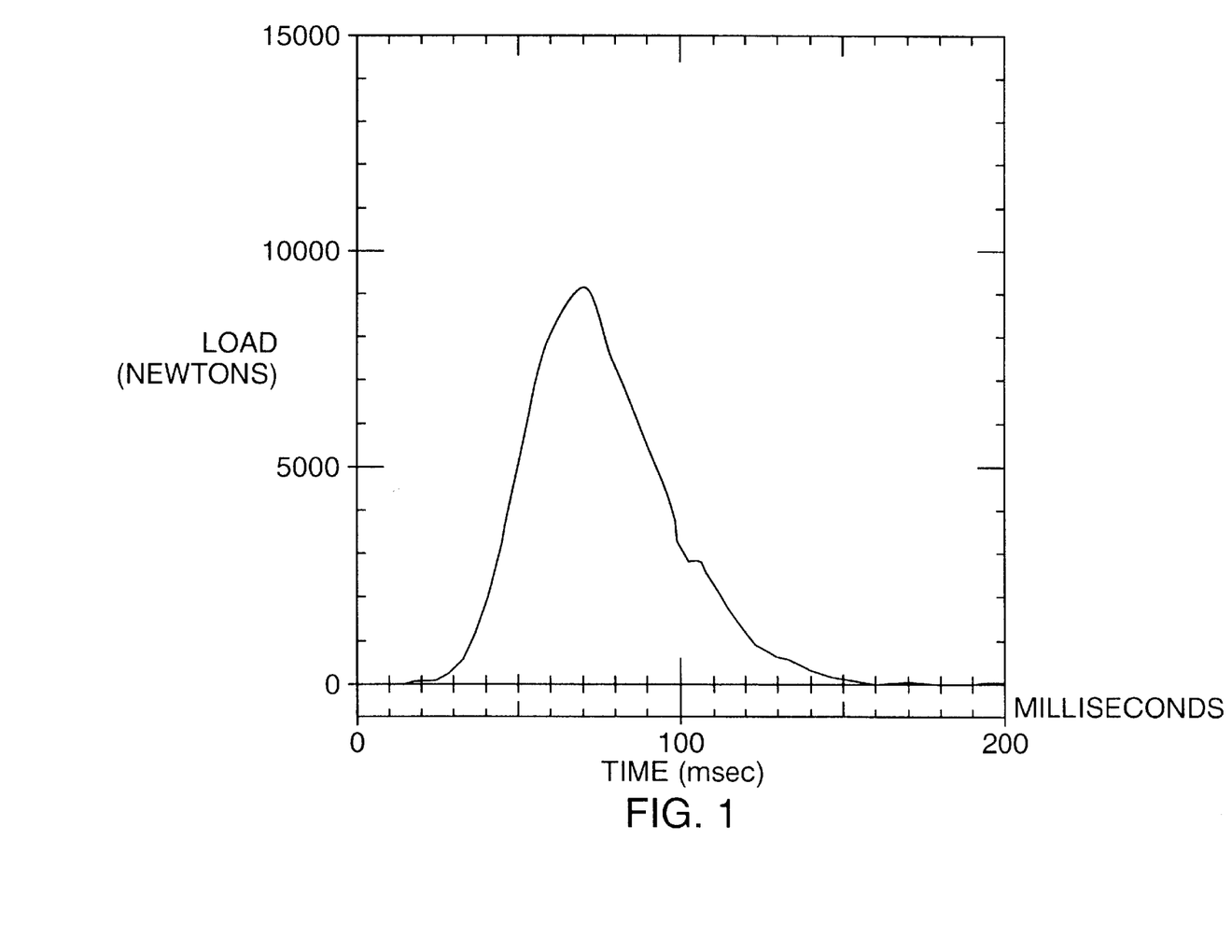
FIG. 1 illustrates the performance (with load as a function of time) of a known poly(ethylene terephthalate) homopolymer seat belt at the torso position in a vehicle collision.

Current vehicle safety seat belts are made from fully drawn polyethylene terephthalate ("PET") fiber which is partially relaxed (2.7%) and having a tenacity of at least 7.5 grams/denier and 14% elongation at break. U.S. Government regulation requires that seat belts must withstand loads up to 6,000 lbs. However, a problem exists with the current PET fiber based seat belts. Crash studies indicate that after the initial vehicle impact occurs (e.g. at a speed of about 35 miles/hour), the occupant tends to move forward from his seated position until the belt engages to build restraining forces. As indicated in FIG. 1, the relatively unyielding belt made from PET fiber exerts a force of at least 2000 pounds (about 9000 Newtons) against the occupant at the seat belt torso position so as to cause the occupant to have high chest, rib cage, head, neck, and back injuries when the occupant rebounds and impacts the back structure of the seat assembly.

When a car collides at a speed of 35 miles/hour, an impact energy to which an average sized person in the car is subjected is at least 500 Joules on the torso belt. Although the current PET fiber may absorb the impact energy, damage to the vehicle occupant still occurs due to the undesirable fiber force-displacement curve. In 70 milliseconds, an average sized passenger will experience high forces of up to 2,000 pounds (about 9,000 Newtons) as shown in FIG. 1.

In order to absorb the impact energy and to reduce the seat belt load against the vehicle occupant, U.S. Pat. No. 3,550,957 discloses a shoulder harness having stitched doubled sections of the webbing arranged above the shoulder of the occupant so that the stitching permits the webbing to elongate from an initial length toward a final length at a controlled rate under the influence of a predetermined restraining force. However, the stitched sections do not give the desirable amount of energy absorption, do not provide uniform response, and are not reusable in multiple crashes. See also U.S. Pat. No. 4,138,157.

U.S. Pat. No. 3,530,904 discloses a woven fabric which is constructed by weaving two kinds of yarns having relatively different physical properties and demonstrates energy absorption capability. U.S. Pat. Nos. 3,296,062; 3,464,459; 3,756,288; 3,823,748; 3,872,895; 3,926,227; 4,228,829; 5,376,440; and Japanese Patent 4-257336 further disclose webbings which are constructed of multiple kinds of warp yarns having different tenacity and elongations at break. DE 19513259A1 discloses webbings which are constructed of short warp threads which will absorb the initial tensile load acting on the webbing and also longer warp threads which will absorb the subsequent tensile load acting on said webbing.

Those skilled in this technical area have recognized the deficiencies in using at least two different yarn types as taught by the preceding references. U.S. Pat. No. 4,710,423 and Kokai Patent Publication 298209 published on Dec. 1, 1989 ("Publication 298209") teach that when using at least two different yarn types, energy absorption occurs in a stepwise manner and thus, the web does not absorb the energy continuously and smoothly. Therefore, after one type of warps absorbs a portion of the impact energy, and before another type of warps absorbs another portion of the impact energy, the human body is exposed to an undesirable shock.

UK Patent 947,661 discloses a seat belt which undergoes an elongation of greater than or equal to 33 percent when subjected to at least 70% of the breaking load. This reference does not teach or suggest the present load limiting yarn.

U.S. Pat. No. 3,486,791 discloses energy absorbing devices such as a rolled up device which separates a slack section of the belt from the taut body restraining section by clamping means which yield under a predetermined restraining force to gradually feed out the slack section so that the taut section elongates permitting the restrained body to move at a controlled velocity. The reference also describes a device which anchors the belt to the vehicle by an anchor member attached to the belt and embedded in a solid plastic energy absorber. These kinds of mechanical devices are expensive, are not reusable, provide poor energy absorption, and are difficult to control. An improvement on the forgoing devices is taught by U.S. Pat. No. 5,547,143 which describes a load absorbing retractor comprising: a rotating spool or reel, seat belt webbing secured to the reel; and at least one movable bushing, responsive to loads generated during a collision situation, for deforming a portion of the reel and in so doing dissipating a determined amount of the energy. This kind of mechanical device is built-in with a specific amount of load limiting and energy absorption towards certain sized occupants, and cannot be adjusted to the needs of different sized occupants in real transportation scenario. Furthermore, this kind of mechanical device is not reusable to limit the load in multiple crashes since the reel is deformed permanently in the first vehicle collision.

U.S. Pat. No. 4,710,423 and Publication 298209 disclose webbing comprised of relaxed polyethylene terephthalate ("PET") yarns having tenacity of at least 4 grams/denier and an ultimate elongation of from 50% to 80%. Due to the inherent physical properties of PET yarn (e.g. glass transition temperature=75° C.), the examples of U.S. Pat. No. 4,710,423 and Publication 298209 show that, at 5% elongation, the load has already reached more than 1500 lbs (about 6,700 Newtons). The damage to the occupant by the seat belt still exists and thus, the belt material needs to be further modified. Examples in these two patents also show that if PET yarn is overrelaxed, the yarn tenacity drops to 2.3 grams/denier.

Kokai Patent Publication 90717 published on Apr. 4, 1995 discloses high strength polybutylene terephthalate homopolymer ("PBT") fiber based energy absorption webbing. The fiber's tenacity is over 5.8 grams/denier, breaking elongation is over 18.0%, and the stress at 10% elongation is less than 3.0 grams/denier. However, this reference fails to teach PBT fiber demonstrating the initial stress requirement which engages the seat belt to protect the occupant and the means to control the initial stress barrier. A low initial stress barrier of yarn results in a low knuckle force point of the finished seat belt which allows excessive excursion of occupant and leads to serious injuries.

It would be desirable to have an improved energy absorbing seat belt, which has a smoother performance than that of the known stitched webbing approach or the known use of at least two different fibers, is reusable in multiple crashes unlike the known mechanical clamp and device approach, and also addresses the ability to control the initial stress barrier and the impact energy absorption from different sized vehicle occupants.

The present inventors in commonly assigned U.S. patent application Ser. No. 08/788,895 filed Apr. 18, 1997 and allowed U.S. patent application Ser. No. 08/819,931 filed Mar. 18, 1997 have responded to the foregoing need. Also see T. Murphy, "Buckling Up for the Future", WARD's Auto World, 95 (1997).

SUMMARY OF THE INVENTION

The present invention also responds to the foregoing need in the art by providing load limiting yarn, a process for making the load limiting yarn, and webbing made from the load limiting yarn. The webbing, if used as seat belt to restrain occupant, demonstrates energy absorption and load limiting performance. This type of load limiting seat belt comprises yarn which has a force-displacement profile characterized by:

(a) when the yarn is subjected to an initial stress barrier of from about 0.8 gram/denier to less than or equal to about 1.2 grams/denier, the yarn elongates to less than 5 percent and has an initial modulus in the range from about 30 grams/denier to about 80 grams/denier;

(b) upon subjecting the yarn to greater than the initial stress barrier and to less than or equal to about 1.5 grams/denier, the yarn elongates further to at least about 8 percent; and (c) upon subjecting the yarn to greater than 1.5 grams/denier, the modulus increases sharply and the yarn elongates further until the yarn breaks at a tensile strength of at least about 6 grams/denier, wherein the yarn comprises a multiplicity of fibers, all of the fibers have substantially the same force-displacement profile, and are made from polymers having a glass transition temperature in the range from about −40° C. to about +70° C.

The term "modulus" as used herein means the slope of the force-displacement curve.

Figure 2:
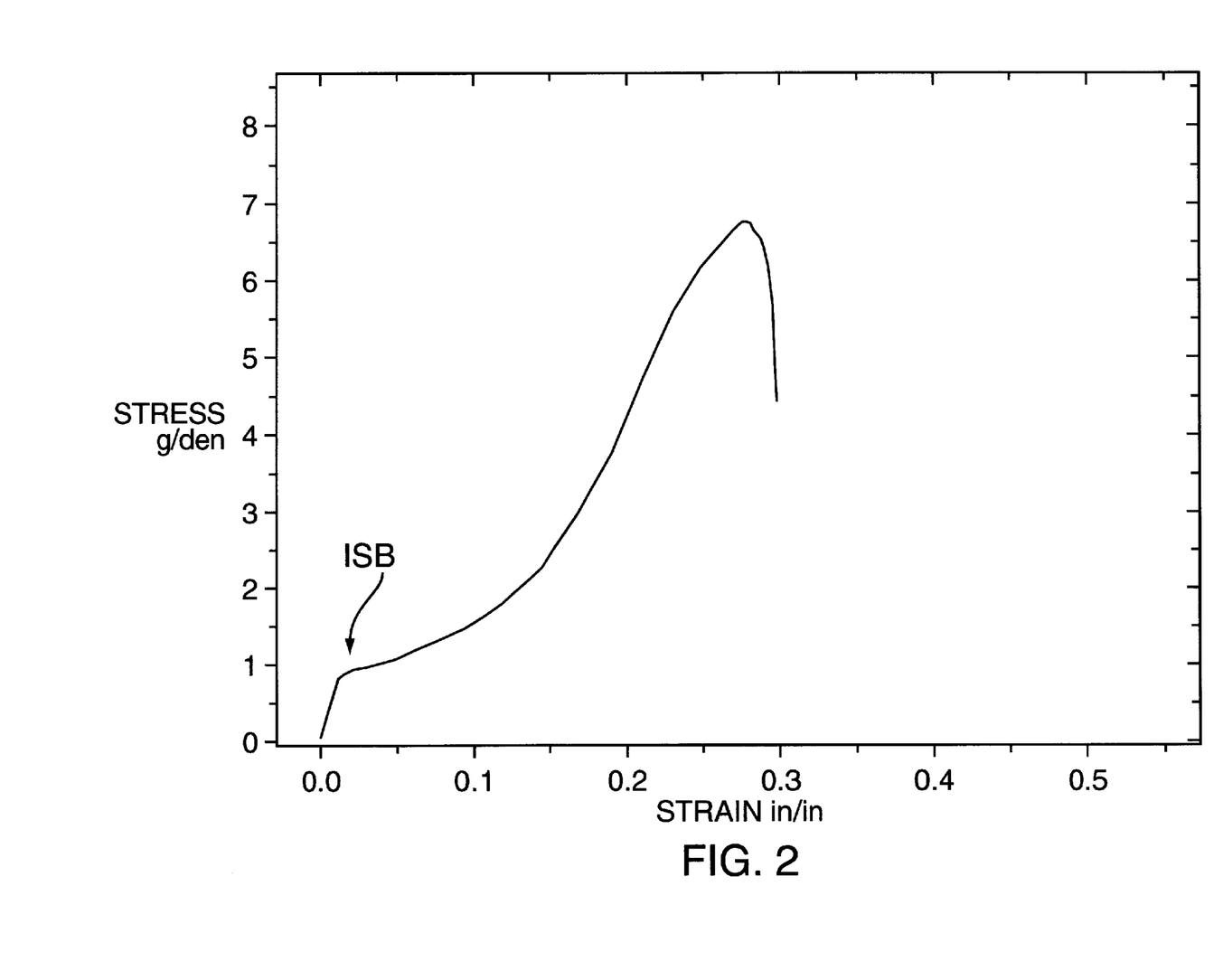
FIG. 2 illustrates a stress-strain curve of the yarn of the present invention.

FIG. 2 illustrates the force-displacement profile of the Inventive Example. The initial stress barrier is indicated as ISB on FIG. 2. The present webbing comprised of this type of yarn is advantageous because the present webbing has better impact energy absorption and a smoother performance than that of the known stitched webbing approach or the known use of at least two different fibers, is reusable unlike the known mechanical device, and also addresses the ability to control the initial stress barrier and the impact energy absorption.

The present invention also provides a process for making load limiting yarn comprising making block copolymer and then spinning the block copolymer into yarn. The present invention for making a block copolymer useful in the present load limiting yarn occurs in a twin screw extruder comprises the steps of:

(A) forwarding aromatic polyester melt to an injection position in the twin screw extruder wherein the aromatic polyester has:

(i) an intrinsic viscosity which is measured in a 60/40 by weight mixture of phenol and tetrachloroethane and is at least about 0.6 deciliter/gram and (ii) a Newtonian melt viscosity which is calculated to be at least about 7,000 poise at 280° C.;

(B) injecting lactone monomer into the molten aromatic polyester from step (A);

(C) dispersing the injected lactone monomer into the aromatic polymer melt so that a uniform mixture forms in less than about thirty seconds; and (D) reacting the uniform mixture resulting from step (C) at a temperature from about 250° C. to about 280° C. to form a block copolymer. All of steps (A) to (D) occur in less than about four minutes residence time in the twin screw extruder The present process is advantageous because high IV starting aromatic polyester can be used and the short reaction time at high temperature results in block copolymer with minimum transesterification, a high melting point, and a high melt viscosity. Preferably, the block copolymer has a melting point of at least about 220° C.

Preferably, the block copolymer melt is then in step (E) devolatilized in the twin screw extruder to remove the residual lactone monomer. Preferably, after the devolatization, ultraviolet absorbers, antioxidants, pigments, and other additives are then in step (F) injected and dispersed into the copolymer melt in the twin screw extruder.

The block copolymer is then forwarded from the twin screw extruder to a fiber spinning equipment. The present process for making fiber from the block copolymer comprises the steps of:

(G) from the twin screw extruder, metering the block copolymer melt at a temperature from about 240° C. to about 280° C. into a spin pot and extruding filaments from the spin pot;

(H) passing the extruded filaments through a heated sleeve having a temperature from about 200° C. to about 300° C.;

(I) cooling the filaments with ambient air wherein the air flows perpendicularly to the filament direction at a flow rate of at least about 0.1 meter per second;

(J) applying a spin finish to the cooled filaments;

(K) taking up the filaments to form yarn on a first roll;

(L) passing the yarn to a second roll having a temperature from greater than the yarn's glass transition temperature to less than the yarn's crystallization temperature;

(M) drawing the yarn between said second roll and draw rolls over a heated shoe or in a draw point localizer which is positioned between said second roll and draw rolls and has a temperature from about 180° C. to about 350° C. and then annealing the drawn yarn on said draw rolls having a temperature from about 140° C. to about 200° C.;

(N) relaxing the drawn yarn between said draw rolls and a final roll so that the relaxed yarn has a shrinkage of about 7 percent to about 20 percent;

(O) cooling the relaxed yarn on the final roll set at room temperature; and (P) winding up the cooled yarn.

The above process for making block copolymer in a twin screw extruder and spinning load limiting yarn may be carried out in a continuous process from the block copolymerization to the final wound-up yarn or in a discontinuous process where the block copolymer is prepared in the twin screw extruder and chipped and the copolymer chips are then spun from a single screw extruder into load limiting yarn.

Other advantages of the present invention will be apparent from the following description, attached drawings, and attached claims.

DETAILED DESCRIPTION OF THE INVENTION

The present yarn has the following force-displacement profile.

(a) When the yarn is subjected to an initial stress barrier of from about 0.8 gram/denier to less than or equal to about 1.2 grams/denier, the yarn elongates to less than 5 percent and preferably, to less than 3 percent. The yarn has an initial modulus in the range from about 30 grams/denier to about 80 grams/denier and the preferred initial modulus ranges from about 40 grams/denier to about 60 grams/denier. The yarn's initial high modulus and the height of the initial stress barrier are needed to engage the seat belt and ensure that all the occupant collision energy will be absorbed under the subsequent load limiting portion of the force-displacement curve.

(b) Upon subjecting the yarn to greater than the initial stress barrier and less than or equal to about 1.5 grams/denier, the yarn elongates further to at least about 8 percent. Preferably, the yarn elongates to at least about 10 percent. This portion of the force-displacement curve is the yarn's load limiting portion which absorbs collision energy and prevents the passenger from experiencing excessive loads.

(c) Upon subjecting the yarn to greater than 1.5 grams/denier, the modulus increases sharply and the yarn elongates further until the yarn breaks at a tensile strength of at least about 6 grams/denier. The yarn comprises a multiplicity of fibers and all of the fibers have substantially the same force-displacement profile. The term "multiplicity of fibers" as used herein means at least 100 filaments are used for each end of seat belt yarn. In a seat belt webbing comprising at least 300 ends of the foregoing yarn, the load on the passenger's torso position may be reduced to as low as 450 lbs (about 2,000 Newtons) even at a collision speed of 35 miles/hour. The reduced force then minimizes or eliminates potential damage to the vehicle occupant.

The yarn is made from a polymer having a glass transition temperature in the range from about −40° C. to about +70° C., preferably about −20° C. to about +60° C., and more preferably about +35° C. to about +55° C. The polymer may be a homopolymer, random copolymer, diblock copolymer, triblock copolymer, or segmented block copolymer.

Examples of preferred homopolymers include polytrimethylene terephthalate; polyisobutylene terephthalate; and long chain alkylene terephthalates and naphthalate polymers.

Examples of preferred random copolyesters include copolyester which, in addition to the ethylene terephthatate unit, contain components such as ethylene adipate, ethylene sebacate, or other long chain alkylene terephthalate units. This component is present in an amount greater than 10 percent.

Examples of preferred block copolymers include diblock, triblock, and segmented block structure. Block copolymers comprise at least one hard crystalline aromatic polyester block and at least one soft amorphous aliphatic polyester block. The crystalline aromatic polyester includes the homopolymers such as polyethylene terephthalate ("PET"); polytrimethylene terephthalate; polybutylene terephthalate; polyisobutylene terephthalate; poly(2,2-dimethylpropylene terephthalate); poly[bis-(hydroxymethyl)cyclohexene terephthalate]; polyethylene naphthalate ("PEN"); polybutylene naphthalate; poly[bis-(hydroxymethyl)cyclohexene naphthalate]; other polyalkylene or polycycloalkylene naphthalates and the mixed polyesters which, in addition to the ethylene terephthalate unit, contain component such as ethylene isophthalate; ethylene adipate; ethylene sebacate; 1,4-cyclohexylene dimethylene terephthalate; or other long chain alkylene terephthalate units. Commercially available aromatic polyesters may be used. A mixture of aromatic polyesters may also be used. The more preferred aromatic polyesters include PET and PEN.

Preferably, the amorphous aliphatic polyester block is made from lactone monomer. Preferred lactone monomers include ε-caprolactone, propiolactone, butyrolactone, valerolactone, and higher cyclic lactones. The most preferred lactone monomer is ε-caprolactone. Commercially available lactone monomers may be used. Two or more types of lactones may be used simultaneously.

Preferably, the aromatic polyester has: (i) an intrinsic viscosity which is measured in a 60/40 by weight mixture of phenol and tetrachloroethane at 25° C. and is at least about 0.6 deciliter/gram and (ii) a Newtonian melt viscosity which is calculated to be at least about 7,000 poises at 280° C. The intrinsic viscosities, as measured in a 60/40 by weight mixture of phenol and tetrachloroethane, of the preferred aromatic polyesters are about 0.8 for PET and about 0.6 for PEN. The more preferred IV for PET is 0.9 and for PEN is 0.7. The Newtonian melt viscosity of PET (with an IV=1) is calculated to be about 16,400 poise at 280° C. and the Newtonian melt viscosity of PEN (with an IV=1) is greater than PET's melt viscosity.

For use in load limiting seat belts, the PET-polycaprolactone block copolymer may have a polycaprolactone concentration of preferably about 10 to about 30 weight percent. In the block copolymer, the polycaprolactone concentration may be varied to achieve the desired initial stress barrier and impact energy absorption with load limiting performance.

The present process for making a block copolymer useful in the present load limiting yarn occurs in a twin screw extruder and comprises the steps of:

(A) forwarding aromatic polyester melt to an injection position in a twin screw extruder wherein the aromatic polyester melt has
  (i) an intrinsic viscosity which is measured in a 60/40 by weight mixture of phenol and tetrachloroethane and is at least about 0.6 deciliter/gram and
  (ii) a Newtonian melt viscosity which is calculated to be at least about 7,000 poise at 280° C.;

(B) injecting lactone monomer into the molten aromatic polyester of step (A);

(C) dispersing the injected lactone monomer into the aromatic polymer melt so that a uniform mixture forms in less than about thirty seconds; and (D) reacting the uniform mixture resulting from step (C) at a temperature from about 250° C. to about 280° C. to form a block copolymer. All of steps (A) to (D) occur in less than about four minutes residence time in the twin screw extruder.

Step (A) for making the block copolymer in a twin screw extruder comprises forwarding aromatic polyester melt to an injection position. The aromatic polyester is added to the twin screw extruder. The aromatic polyester may be molten and then fed by a melt metering pump to the twin screw extruder or the aromatic polyester may be fed in pellet form fed by a "weight in loss" feeder to the twin screw extruder and then melted in the twin screw extruder. As those skilled in the art know, a weight in loss feeder has a hopper filled with pellets and the feeding rate is controlled by weight loss of pellets from the hopper. If aromatic polyester melt from a reactor is used as the starting material, intermeshing close conveying elements may be used to forward the melt downstream. If aromatic polyester pellets are used as the starting material, preferably intermeshing open, open to close, and close conveying elements are assembled under the feeding position in the twin screw extruder to melt the pellets and to forward the melt downstream to the injection position.

Figure 3:
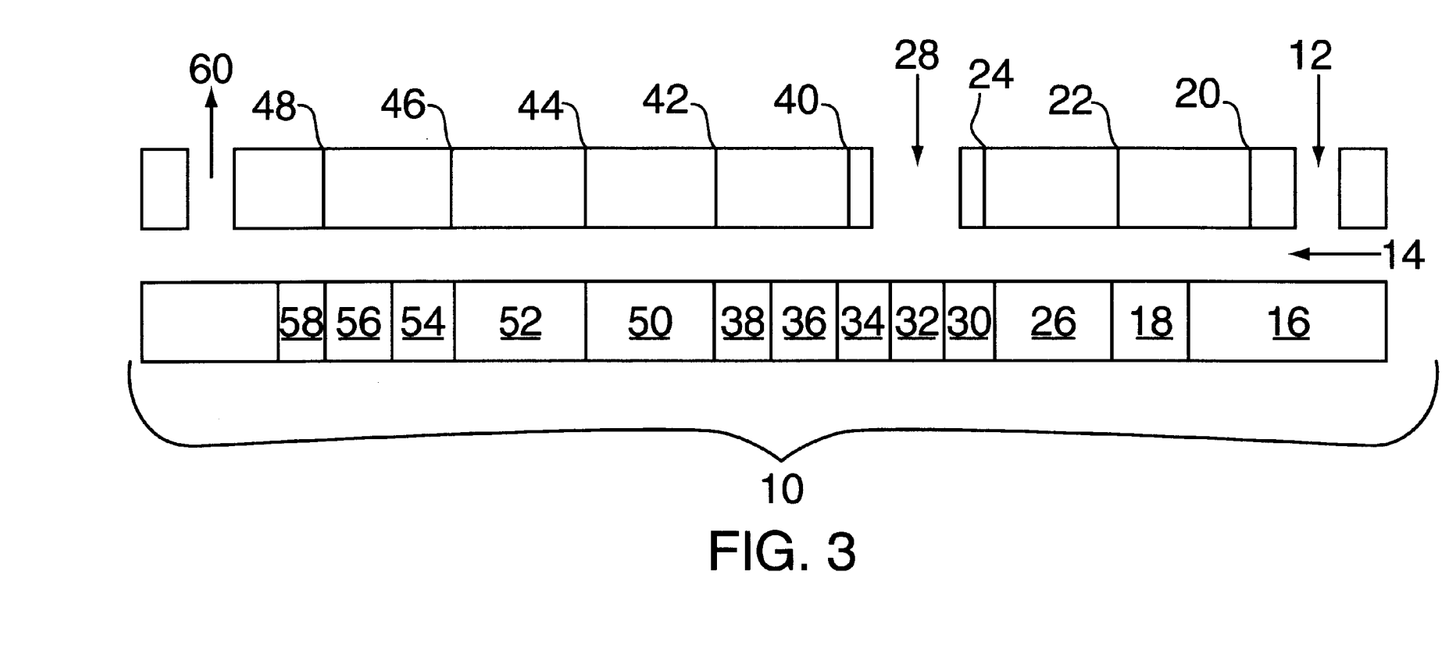
FIG. 3 illustrates twin screw extruder configuration useful in the present process.

We have found that by using a twin screw extruder, mixing and reaction of the aromatic polyester melt with the lactone monomer having a drastic viscosity difference become feasible. Useful twin screw extruders are commercially available; however, the mixing elements and the element arrangement sequence thereof in the twin screw extruder needed for the present invention are critical and are described below. Preferred twin screw extruders are intermeshing twin screw extruders. FIG. 3 illustrates one of the preferred intermeshing twin screw extrusion processes used in the present invention. A single screw extruder such as taught by U.S. Pat. No. 4,045,401 is not useful in the present invention because a single screw extruder does not provide the fast mixing, residence time, residence time distribution, melt agitation, and process control required for the present invention.

The initial extrusion temperature exceeds the melting point (as measured by Perkin-Elmer Differential Scanning Calorimeter (DSC) from the maxima of the endotherm resulting from scanning a 2 milligram sample at 20° C. per minute) of the aromatic polyester used. The melting points of the preferred aromatic polyesters are 250° C. for PET and 266° C. for PEN. The preferred initial extrusion zone temperature is at least about 30° C. above the aromatic polyester melting point. Thus, the preferred initial extrusion temperature for PET is at least about 280° C. while the preferred initial extrusion temperature for PEN is at least about 296° C.

Step (B) for making the block copolymer comprises injecting lactone monomer into the molten aromatic polyester from step (A). Preferably, a piston pump is used to inject the lactone monomer at a constant rate into the aromatic polyester melt.

Preferably, the lactone monomer is premixed with catalysts at room temperature. Commercially available catalysts may be used. Preferred catalysts are organometallics based on metals such as lithium, sodium, potassium, rubidium, cesium, magnesium, inorganic acid salts, oxides organic acid salts and alkoxides of calcium, barium, strontium, zinc, aluminum, titanium, cobalt, germanium, tin, lead, antimony, arsenic, cerium, boron cadmium and manganese; and their organometallic complexes. More preferred catalysts are organic acid salts and organometallic compounds of tin, aluminum, and titanium. The most preferred catalysts are tin diacylate, tin tetra acylate, dibutyltin oxide, dibutyltin dilaurate, tin octonate, tin tetra acetate, triisobutyl aluminum, aluminum acetylacetonate, aluminum isopropoxide, aluminum carboxylates, tetra butyl titanium, germanium dioxide, antimony trioxide, prophyrin and phthalocyanine complexes of these metal ions. Two or more catalyst types may be used in parallel. Preferably, the amount of catalyst used is about 0.01 to about 0.2 weight percent based on the combined weight of aromatic polyester and lactone monomer.

Step (C) for making the block copolymer comprises dispersing the injected lactone monomer into the aromatic polymer melt so that a uniform mixture forms in less than about thirty seconds and preferably, in less than about twenty seconds. The phrase "uniform mixture" as used herein means even distribution of the lactone monomer into the aromatic polyester melt. Preferably, distributive combing mixers are used to disperse the injected lactone monomer into the high melt viscosity aromatic polyester melt. This rapid uniform mixture formation results in uniform ring opening polymerization of lactone, uniform block copolymer product, and stable downstream process. Preferably, at least one forward distributive intermeshing combing mixer, at least one neutral distributive intermeshing combing mixer, and at least one reverse distributive intermeshing combing mixer are used to achieve the desired mixing.

Step (D) for making the block copolymer comprises reacting the uniform mixture resulting from step (C) at a temperature from about 250° C. to about 280° C. to form block copolymer in less than about four minutes. The mixture is forwarded further downstream into a reaction zone where turbulators, mixers, and conveying elements are assembled. Turbulators are used to continuously agitate the melt, increase extruder volume without sacrificing the throughput rate, and control the reaction time. The hydroxyl end group of the aromatic polyester initiates ring-open polymerization of lactone monomer under catalytic conditions to form lactone block at the end of the aromatic polyester. The melt is constantly agitated by the turbulators and mixing elements to homogenize the reaction. This short reaction time minimizes transesterification while ensuring complete reaction which means to polymerize the lactone monomer to form the block at the aromatic polyester chain end and complete consumption of the injected lactone monomer. To determine residence time and residence distribution time, we added colored pellets which served as a marker to the aromatic polyester pellets. The term "residence time" means the time period starting from the colored pellet addition to the strongest color appearance. The term "residence distribution time" means the time range starting from the color appearance and ending at color disappearance. As the residence distribution time decreases, product uniformity increases. The residence distribution time is preferably less than about three minutes and more preferably less than about one minute. Preferably, the degree of transesterification between aromatic polyester and lactone blocks is less than five weight percent of the combined material weight.

Preferably, the block copolymer melt is then in step (E) devolatilized under vacuum in the twin screw extruder to remove the residual lactone monomer. The devolatization element allows the formation of thin polymer melt film and high surface area for effective removal of volatiles.

Preferably, after the devolatization, ultraviolet absorbers, antioxidants, pigments, and other additives are then in step (F) injected and dispersed into the copolymer melt in the twin screw extruder by a piston pump or a gear pump at a constant rate. The forward distributive intermeshing combing mixers are used to homogenize the additives in the copolymer. The melt in the temperature range of about 240° C. to about 280° C. is then forwarded downstream to a melt metering pump for fiber pinning.

Preferred ultraviolet absorbers are stabilizers based on benzophenones, benzotriazoles, triazines, and oxanilides. The most preferred ultraviolet absorbers are 2-(4,6-diphenyl-1,3,5-triazin-2-yl)-5-hexyloxy phenol; 2-[4, 6-bis (2,4-dimethylphenyl)- 1,3, 5-triazin-2-yl]-5-octyloxy phenol; 2- (2H-benzotriazol-2-yl)-p-cresol; 2-(2H-benzotriazol-2-yl)-4,6-bis(1-methyl-1-phenylethyl)phenol; 2-ethoxy-2'-ethyloxanilide; 5-tert-butyl-2-ethoxy-2'-ethyloxanilide; propanedioic acid; [(4-methoxyphenyl)-methylene]-; and bis (1,2,2,6,6-pentamethyl-4-piperidinyl) ester. Two or more stabilizer types may be used in parallel. Preferably, the amount of ultraviolet absorber used is about 0.1 to about 2 weight percent based on the combined weight of aromatic polyester and lactone monomer.

Preferred antioxidants are additives based on hindered phenolics, hindered benzoates, hinder amines, and phosphites/phosphonites. The most preferred antioxidants are tetrakis[methylene(3,5-di-tert-butyl-4-hydroxyhydrocinnamate)]methane; triethyleneglycol bis[3-(3'-tert-butyl-4'-hydroxy-5'-methylphenyl) propionate]; 1,6-hexanediamine, N,N'-bis(2, 2,6, 6-tetramethyl-4'-piperidinyl)- ,polymer with morpholine-2,4, 6-trichloro-1,3, 5-triazine; and tris(2,4-di-tert-butylphenyl) phosphite. Two or more additive types may be used. Preferably, the amount of antioxidant used is about 0.1 to about 1 weight percent based on the combined weight of aromatic polyester and lactone monomer.

The block copolymer is then forwarded from the twin screw extruder to the fiber spinning equipment. The present process for making load limiting yarn from the block copolymer comprises the steps of:

(G) from the twin screw extruder and through a melt metering pump, metering the block copolymer melt at a temperature from about 240° C. to about 280° C. into a spin pot and extruding filaments from the spin pot equipped with a spinnerette;

(H) passing the extruded filaments through a heated sleeve having a temperature from about 200° C. to about 300° C.;

(I) cooling the filaments with ambient air wherein the air flows perpendicularly to the filament direction and at a flow rate of at least about 0.1 meter per second;

(J) applying a spin finish to the cooled filaments;

(K) taking up the filaments to form yarn on a first roll;

(L) passing the yarn to a second roll having a temperature from greater than the yarn's glass transition temperature to less than the yarn's crystallization temperature;

(M) drawing the yarn between said second roll and draw rolls over a heated shoe or in a draw point localizer which is positioned between said second roll and draw rolls and has a temperature from about 180° C. to about 350° C. and then annealing the drawn yarn on said draw rolls having a temperature from about 140° C. to about 200° C.;

(N) relaxing the drawn yarn between said draw rolls and a final roll so that the relaxed yarn has a shrinkage of about 7 percent to about 20 percent;

(P) cooling the relaxed yarn on the final roll set at room temperature; and (Q) winding up the cooled yarn.

The above process for making block copolymer in a twin screw extruder and spinning load limiting yarn may be carried out in a continuous process from the block copolymerization to the final wound-up yarn or in a discontinuous process where the block copolymer is prepared in the twin screw extruder and chipped and the copolymer chips are then spun from a single screw extruder into load limiting yarn.

Figure 4:
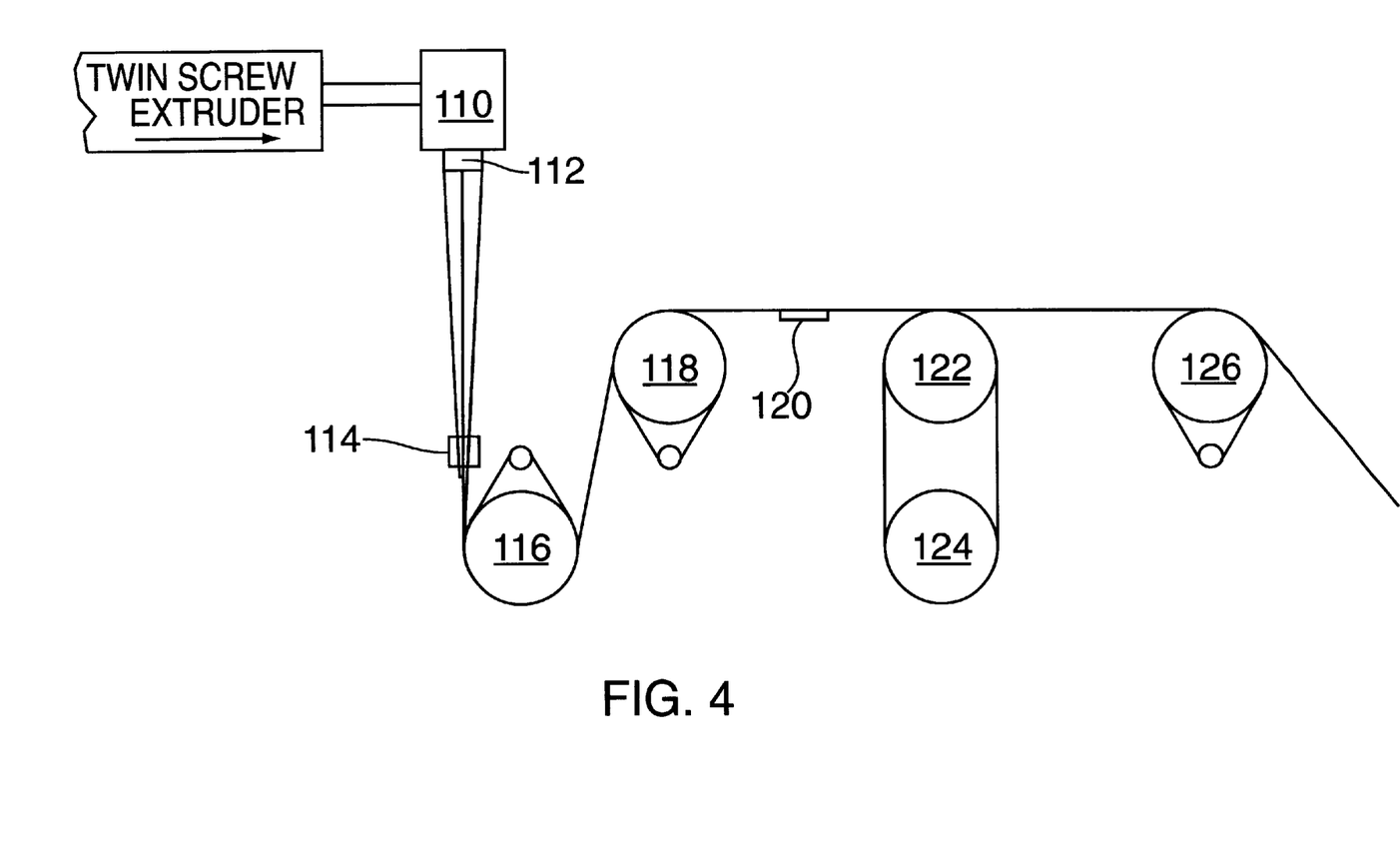
FIG. 4 illustrates the present fiber spin-draw-relax process.

FIG. 4 illustrates the present process for manufacturing load limiting yarn with a specific type of stress-strain curve (FIG. 2). The process consists of block copolymerization in the twin screw extruder, melt spinning, filament cooling, yarn drawing, relaxing, and winding steps.

In step (G) which is the first step for making load limiting yarn from the block copolymer, the melt at a temperature from about 240° C. to about 280° C. is fed through a metering pump into a spin pot which is comprised of filtration screens and a spinnerette. Preferably, the polymer throughput rate through the spinnerette is in the range from about 1.5 grams/hole/minute to about 3.5 grams/hole/minute and the spinning temperature is in the range from about 240° C. to about 280° C. Preferably, the melt viscosity of PET-Polycaprolactone copolymer under these spinning conditions, e.g., spinning temperature and shear rate, is between about 2,000 to about 4,000 poise. Filaments are extruded from the spin pot.

In steps (H) and (I), the extruded filaments pass through a heated sleeve having a temperature from about 200° C. to about 300° C. and are then cooled by ambient air flowing perpendicular to the filament direction at a flow rate of at least about 0.1 meter/second. Ambient air has a temperature from about 10° C. to about 30° C. The proper temperature of the heated sleeve and adequate air flow rate are important for achieving the needed yarn and filament uniformity. Yarn uniformity is measured by uster method which indicates yarn denier consistency. Filament uniformity is measured by radial birefringence method which indicates the degree of molecular orientation in both surface and core of the filaments. Prior to take-up, a spin finish is applied in step (J) to the quenched or cooled filaments by a finish applicator. Preferably, the applied spin finish is based on a water soluble low molecular weight polymer which may be efficiently removed by dissolving it in water.

In step (K), the quenched or cooled filaments are taken up by a first roll to obtain as-spun yarn with low molecular orientation and minimum crystallinity. The phrase "low molecular orientation" as used herein preferably means that the radial birefringence is less than about 0.01. The phrase "minimum crystallinity" as used herein preferably means that the crystallinity is less than about 5 percent. In step (I), the yarn is then fed onto a second roll having a temperature from greater than the yarn's glass transition temperature ("Tg") to less than the yarn's crystallization temperature ("Tc"). The glass transition temperature of PET-polycaprolactone copolymer varies between about 35° C. to about 55° C., depending upon the weight percent of ε-caprolactone in the polymer and block transesterification. The crystallization temperature of PET-polycaprolactone copolymer varies between about 100° C. to about 170° C., depending upon the weight percent of ε-caprolactone in the polymer and the degree of transesterification. The purpose of this heating is to preheat the yarn.

In step (M), the preheated yarn is drawn between the second roll and draw rolls over a heated shoe or in a draw point localizer which is positioned between the second roll and draw roll and has a temperature from about 180° C. to about 350° C. and then annealing the drawn yarn on the draw rolls having a temperature from about 140° C. to about 200° C. The purpose of the heated shoe or draw point localizer is to further heat the yarn and localize the drawing of the yarn. The hot media in the draw point localizer may be air or steam. Draw rolls having a temperature between about 140° C. to about 200° C. are used to promote crystallization and annealing of the yarn. Preferably, the yarn is drawn with at least 6:1 draw ratio. The time for the annealing of drawn yarn is less than about one second.

In step (N), the drawn yarn is relaxed between the draw rolls and a final roll with a controlled shrinkage set by the speed difference of the rolls and the temperature of the draw rolls from which the yarn is relaxed. Preferably, the degree of shrinkage is between about 7% to about 20% to yield the yarn with desired stress-strain curve. The final roll is set at room temperature. In steps (O) and (P), the relaxed yarn is cooled and wound-up on a winder set at room temperature and at the speed of the final roll.

Seat belts are usually woven with a warp yarn of about 1000 to about 1500 denier and a breaking strength of at least about 5 grams/denier and weft yarn with a denier of about 200 to about 900 and a breaking strength of at least about 5 grams/denier. Weaving conditions are selected in order for the seat belt to preserve the stress/strain properties of the yarn and maintain the webbing strength. Our results indicate that the most commonly used 2×2 twill weaving pattern may be successfully used for load limiting seat belts. The seat belt webbing is dyed in a thermosol equipment at a temperature between about 100° C. to about 180° C. The automotive collision tests at 35 miles per hour of this type of load limiting seat belt show force against occupant is reduced to 800 lbs (3.6 KN)¯1,600 lbs ( 7.2 KN) and injury criteria are minimized.

The present webbing provides the desired load limiting characteristics in the absence of a clamping device such as taught by U.S. Pat. No. 3,486,791; stitching such as taught by U.S. Pat. No. 3,550,957; and a mechanical energy absorbing device such as the constant force retractor taught by U.S. Pat. No. 5,547,143. The present webbing and yarn provide the desired load limiting characteristics and are made from material other than the PBT homopolymer taught by Publication 90717. The present webbing provides the desired load limiting characteristics by using warp yarns having substantially the same force-displacement profile instead of the plurality of warp yarn force-displacement profiles taught by U.S. Pat. Nos. 3,756,288; 3,823,748; 3,872,895; 4,288, 829; and 5,376,440. The present webbing provides the desired load limiting characteristics and is made from polymer other than the PET homopolymer taught by U.S. Pat. No. 4,710,423 and Publication 298209.

The present web is useful for seat belts, parachute harnesses and lines, shoulder harnesses, cargo handling, safety nets, trampolines, safety belts or harnesses for workers at high attitudes, military arrestor tapes for slowing aircraft, ski tow lines, and in cordage applications such as for yacht mooring or oil derrick mooring.

Test Methods

In the following Examples, the reduced specific viscosity was determined as follows. Solution viscosity and solvent viscosity were measured and specific viscosity was calculated by (solution viscosity-solvent viscosity)/(solvent viscosity). Reduced specific viscosity was calculated from specific viscosity/solution concentration.

The intrinsic viscosity of polymer was determined by plotting the reduced specific viscosity of polymer solution versus solution concentration in a mixed solvent of 60 parts of phenol and 40 parts of tetrachloroethane at 25° C. The intercept was the intrinsic viscosity of polymer. It is understood that IV is expressed in units of deciliters per gram or (dl/g) herein even if such units are not indicated.

Thermal properties were measured by Perkin Elmer Differential Scanning Calorimetry-7 using a polymer chip sample size of about five milligrams, heating the sample to 285° C. at the rate of 10° C./minute, holding the sample at 285° C. for two minutes, and cooling the sample to 30° C. at the rate of 10° C./minute. The peak temperature of endotherm in heating scan was the melting point of a polymer and the peak temperature of exotherm in cooling scan was the crystallization temperature of a polymer. The glass transition temperature of a polymer was the second order thermal transition temperature during both heating and cooling scans.

For the preferred yarn made of block copolymer, the Newtonian melt viscosity for the starting PET of the Inventive Example was calculated to be at least 7,000 poise at 280° C. based on Andrzej Ziabicki, "Effects of Molecular Weight on Melt Spinning and Mechanical Properties of High-Performance Poly(ethylene Terephthalate) Fibers", *Textile Res. J.* 66(11), 705–712 (1996) and A. Dutta, "Identifying Critical Process Variables in Poly(ethylene Terephthalate) Melt Spinning", *Textile Res. J.* 54, 35–42 (1984). The Newtonian melt viscosity means the melt viscosity at zero shear rate.

Melt viscosity of block copolymer under various spinning conditions was extrapolated from melt rheology data obtained from Kayeness Galaxy V capillary rheometer with capillary die L/D=30:1 using shear rates ranging from 50/sec to 998/sec. The samples were dried at 160° C. for 16 hour under vacuum before measurement. 15 gram of sample was packed into the rheometer and allowed to melt to reach temperature equilibrium for 6 minutes before beginning melt viscosity measurements. Runs under different temperature were made at constant shear rate over a range of shear rates including 50 sec$^{-1}$, 100 sec$^{-1}$, 200 sec$^{-1}$,499 sec$^{-1}$, and 998 sec$^{-1}$ and at times up to 20 minutes. No corrections were made for end effects so values are apparent melt viscosities.

Radial birefringence was determined by using an Ausjena interference microscope to measure the radial structure through a correct measurement of refractive index profiles of fiber. An oil with a refractive index of 1.300 to 1.800 was used. A regular model was used to calculate refractive index profile on the basis of three assumptions 1) fiber is perfectly symmetrical about center, 2) refractive index profile varies smoothly, and 3) fiber is round.

Tensile properties were measured on an Instron machine equipped with pneumatic cord and yarn grips which hold the yarns at the gauge length of 10 inches. The as-wound-up yarn was then pulled by the strain rate of 10 inch/minute under standard conditions (23±2° C. 50%±5% relative humidity) and the data was recorded by a load cell. From this data, the stress-strain curves were obtained. Tenacity was the breaking strength (in grams) divided by the yarn's denier.

Shrinkage was defined as an amount length contraction of a yarn on its exposure to elevated temperature. Here, shrinkage was calculated based on the speed difference of draw and last rolls divided by the speed of draw rolls.

Inventive Example

Referring to FIG. 3, the dried PET pellets (IV=0.9; calculated MV=15,310 poise at 280° C.) were fed by a Ktron "weight in loss" feeder into a counter-rotation intermeshing twin screw extruder 10 (diameter=27 millimeters; length= 1296 millimeters; screw=150 revolutions per minute) at feed point 12 at a rate of 12.8 pounds/hour. In the direction of arrow 14, the pellets were forwarded by open intermeshing elements 16 downstream and started to melt in close intermeshing elements 18 at the first zone 20 and the second zone 22. The melt was then forwarded at third zone 24 into a compressive element 26 which acted as a dynamic seal at the end of feeding zone and gave tight compression and reduced backflow of polymer melt and injected materials. The first feeding zone was not heated. The temperature of the second and third zones was set at 290° C.

The premixed ε-caprolactone and catalyst (tin octonate, 0.075 wt % of PET-Polycaprolactone) were injected into the extruder by a piston pump at injection point 28 at a rate of 2.2 pounds/hour. The injected materials were mixed with PET melt back and forth by two (30 millimeter) intermeshing distributive forward combing mixers 30 and 32, two (30 millimeter) intermeshing distributive neutral combing mixers 34 and 36, and one (30 millimeter) intermeshing distributive reverse combing mixer 38 assembled under the region of the injection point 28. A uniform mixture was then obtained in thirty seconds and forwarded into the reaction zone. The temperature of the fourth zone 40 was set at 280° C.

The reaction zone temperature through zones 42, 44, 46, and 48 was set at 262° C. At this zone, in the presence of tin octonate, the PET chain extension by ring opening polymerization of ε-caprolactone was started by the hydroxyl end of PET. The reaction zone consisted of two (110 millimeters) turbulators 50 and 52 which provided high percent of extrusion volume, followed by one neutral mixer 54 which homogenized the reaction, and two (30 millimeter) turbulators 56 and 58 which provided more contact time for the chain extension. This screw pattern allowed the reaction to be completed in a four minute residence or reaction time and the melt to be continuously agitated during the reaction.

The copolymerized melt was forwarded into a devolatilizing zone 60 where the vacuum was set at –950 mbar. The amount of removed unreacted ε-caprolactone was 0.36 weight percent of injected ε-caprolactone.

The IV of PET-Polycaprolactone (15%) copolymer was 0.97. The transesterification between PET and Polycaprolactone blocks was less than 5%. The glass transition temperature of copolymer was 45° C., and the melting temperature of copolymer was 231° C.

Referring to FIG. 4, the melt produced by the reactive twin screw extrusion process was fed into a spin pot 110 by a metering pump at a rate of 15 pounds/hour. The temperature of melt was controlled at 260° C. The pressure at the end of extruder was 700 pounds per square inch, and the pressure in the spin pot was 1270 pounds per square inch.

The spin pot contained three layer mesh screens and a 50 round hole spinnerette with a dimension of diameter 0.021 inch and length 0.072 inch. The polymer throughput was 2.27 grams/hole/minute with the shear rate of 2,150 sec$^{-1}$. The melt viscosity of PET-PCL 15% at the spinning condition (shear rate=2,150 sec$^{-1}$ and melt temperature =260° C.) was approximately 2,800 poise.

The extruded filaments went through a heated sleeve 112 set at 280° C. and were cooled by air flow perpendicular to as-spun yarn at a flow rate of 0.13 meter/second. A water soluble spin finish was applied at 114 to the yarn, and the yarn was taken up onto a roll 116 at a speed of 270 meter/minute to form as-spun yarn. The as-spun yarn had a radial birefringence equal to 0.001 and denier of 3780.

The as-spun yarn was then fed onto a godet 118 heated to 60° C. at the speed of 275 meter/minute, and drawn 6.7:1 on a heated shoe 120 set at 218° C. The drawn yarn was annealed on a set of rolls 122 and 124 maintained at 165° C. The annealing time for the yarn was 0.2 second.

The fully drawn yarn was relaxed at 165° C. between draw and cold rolls 126 with 12% shrinkage to obtain desired stress-strain curve (FIG. 2). The initial modulus of yarn was 57 g/denier, the strain at 1 g/denier and 1.5 g/denier were 4% and 10%, respectively. The breaking strength of yarn was 6.9 g/denier. The denier of each filament is 13. The initial stress barrier was 0.87 gram/denier.

All the above steps, reaction of PET with ε-caprolactone, spinning, cooling, drawing and relaxation may be carried out either stepwise in a discontinuous process or more advantageously as a continuous process. The above example describes a continuous process.

Figure 5:
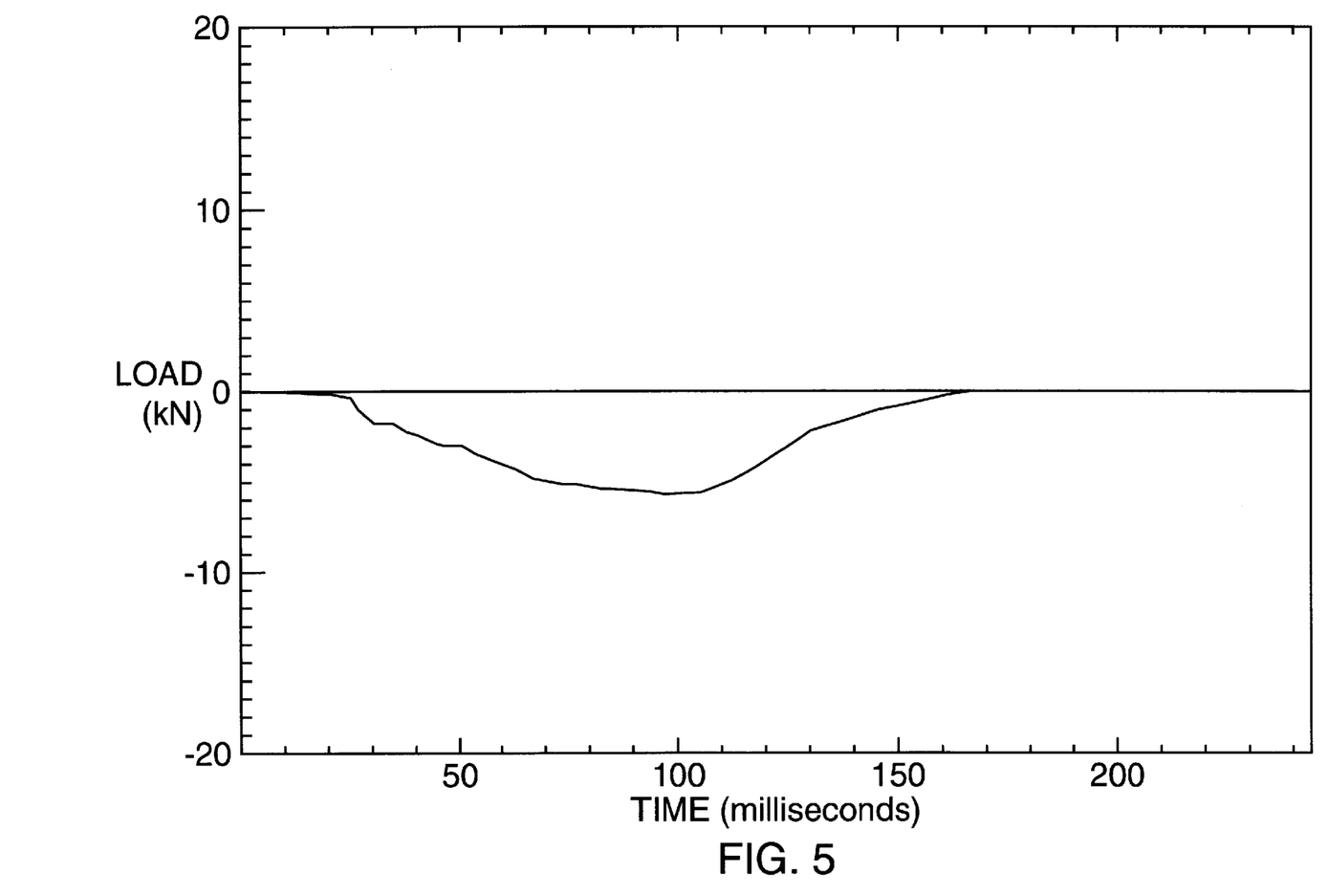
FIG. 5 illustrates the performance (with load as a function of time) of the load limiting seat belt of the present invention at the torso position in a vehicle collision.

The above yarn was woven and dyed into seat belt webbing. The automotive collision tests using a sled test showed the load limiting performance of seat belt and the reduction of occupant injury criteria. In the sled test, the average sized dummy was restrained with seat belt webbing and fully instrumented in a compact vehicle. The sled test was conducted at a speed of 40 miles per hour and pulse rate of 28 g (which is the acceleration of gravity). The movement of the dummy and injury criteria were recorded by sensors and high speed cameras. FIG. 5 illustrates the performance (with load as a function of time) of the present load limiting seat belt at the torso position in a vehicle collision. Table 1 compares the performance of load limiting and PET seat belt webbings and shows the reduction of force against the occupant and improvement of injury criteria. As those skilled in the art know, in Docket 74-14: 49 C.F.R. Parts 571, 572, and 585, pulse rate means acceleration expressed as a multiple of g (which is the acceleration of gravity). HIC means the Head Injury Criteria. Chest mm means the chest deflection of the vehicle occupant.

| Test no. | Pulse | Lap (kN) | Torso (kN) | HIC | Chest (g) | Chest (mm) | Pelvis (g) | Femur kN |
|---|---|---|---|---|---|---|---|---|
| Inventive Example | 28 g 40 mph | 6 | 6 | 436 | 45 | 36.3 | 40 | 0.9/–1.4 L 1.2/–0.2 R |
| Comparative | 40.5 g 36 mph | 8.5 | 9.7 | 974 | 59.9 | 64 | 55.9 | 1.8/–4.5 L 1.8/–1.6 R |

What is claimed is:

1. Yarn having a force-displacement profile such that:
   (a) when said yarn is subjected to an initial stress barrier of from about 0.8 gram/denier to less than or equal to about 1.2 grams/denier, said yarn elongates to less than 5 percent and has an initial modulus in the range from about 30 grams/denier to about 80 grams/denier;
   (b) upon subjecting said yarn to greater than said initial stress barrier and to less than or equal to about 1.5 grams/denier, said yarn elongates further to at least about 8 percent; and
   (c) upon subjecting said yarn to greater than 1.5 grams/ denier, the modulus increases sharply and said yarn elongates further until said yarn breaks at a tensile strength of at least about 6 grams/denier, wherein said yarn comprises a multiplicity of fibers, all of said fibers have substantially the same force-displacement profile, and are made from polymers having a glass transition temperature in the range from about −40° C. to about +70° C.

2. The yarn of claim 1 wherein in part (a), said yarn elongates to less than about 3 percent.

3. The yarn of claim 1 wherein in part (a), said initial modulus ranges from about 40 to about 60 grams/denier.

4. The yarn of claim 1 wherein in part (b), said yarn elongates to at least about 10 percent.

5. The yarn of claim 1 wherein said yarn is made from a block copolymer of aromatic polyester and lactone monomer and said block copolymer has a glass transition temperature in the range from about +20° C. to about +60 C.

6. The yarn of claim 5 wherein said aromatic polyester is polyethylene terephthalate.

7. The yarn of claim 6 wherein said polyethylene terephthalate has an intrinsic viscosity which is measured in a 60/40 by weight mixture of phenol and tetrachloroethane at 25° and is at least about 0.8 deciliter per gram.

8. The yarn of claim 5 wherein said lactone monomer is $\epsilon$-caprolactone.

9. The yarn of claim 8 wherein the amount of said $\epsilon$-caprolactone is from about 10 to about 30 weight percent of said block copolymer.

* * * * *